UNITED STATES PATENT OFFICE.

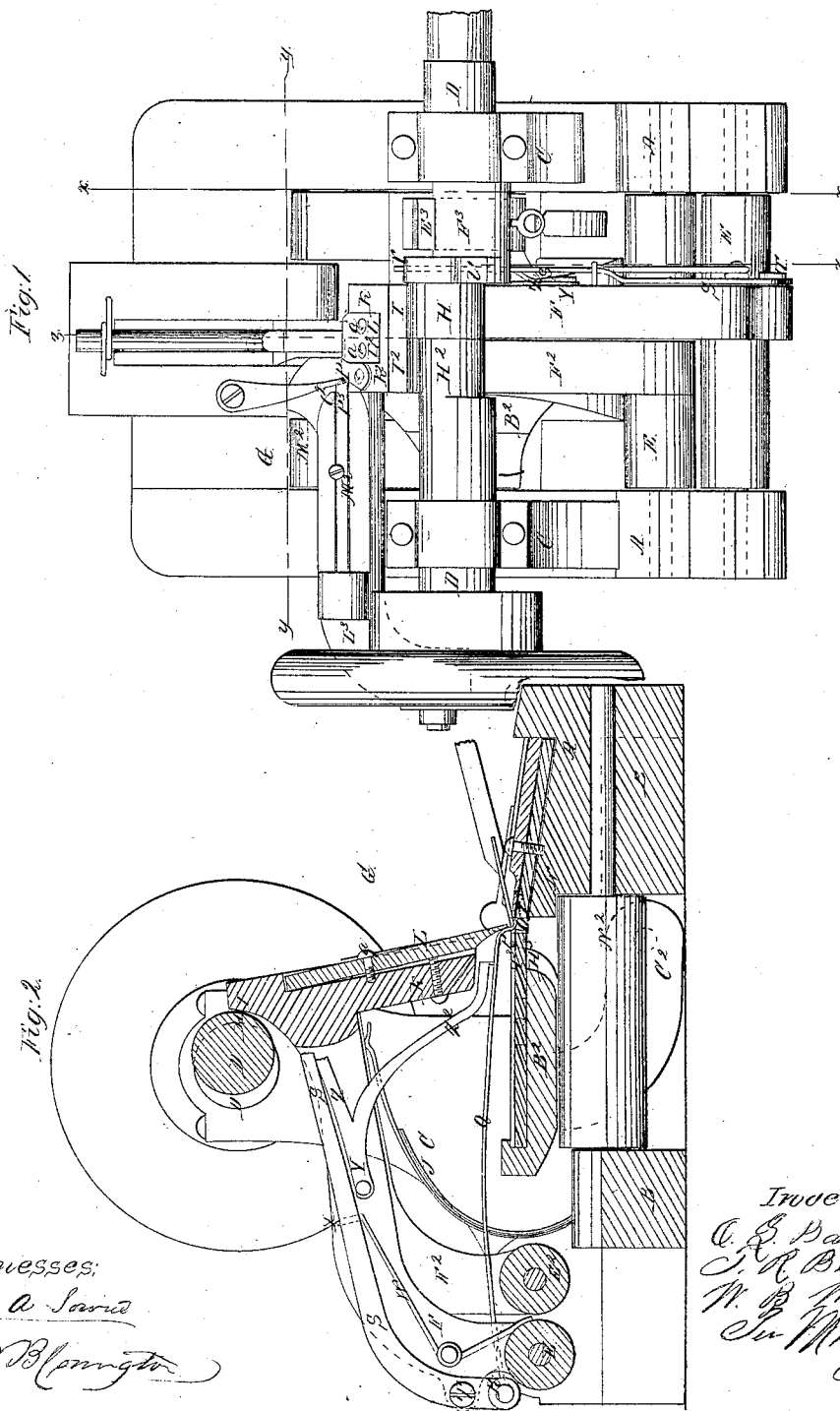

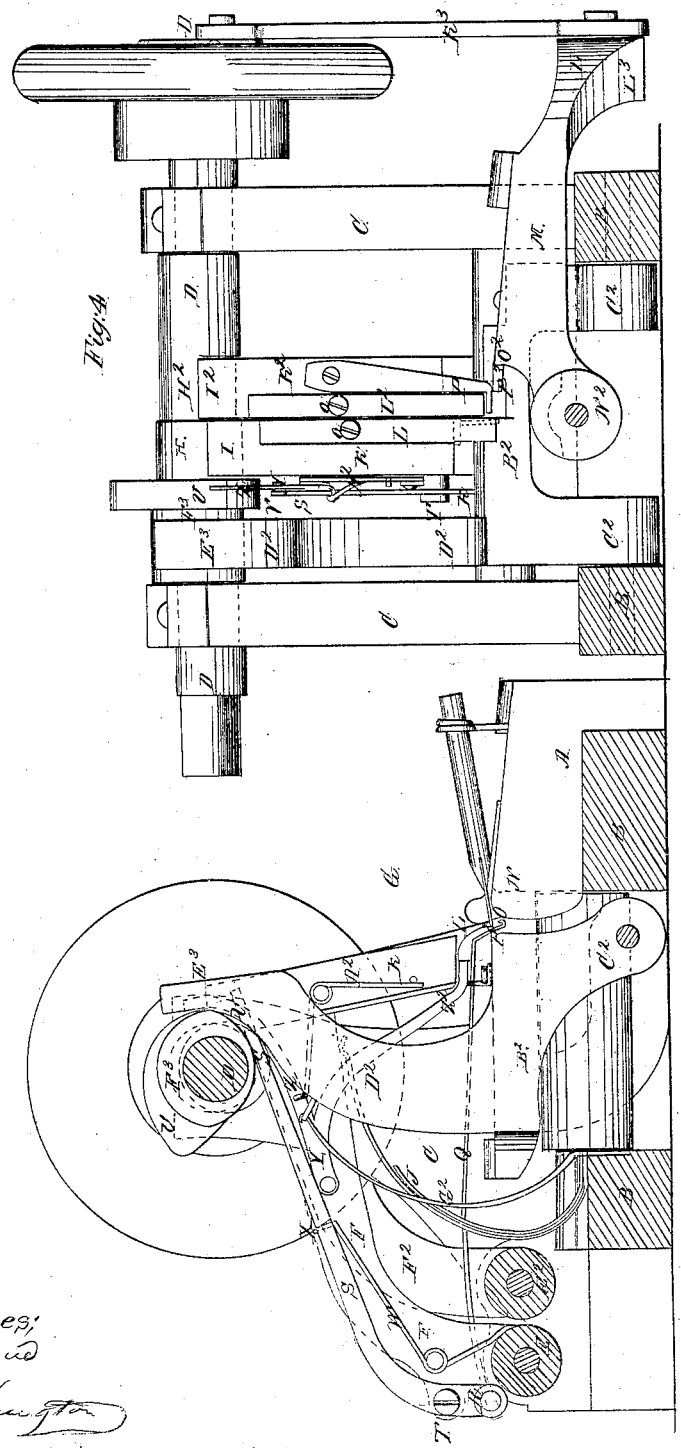

O. L. BASSETT, T. R. BEARSE, AND W. B. WILBER, OF TAUNTON, MASS.

IMPROVEMENT IN MACHINERY FOR MAKING NAILS AND TACKS.

Specification forming part of Letters Patent No. 58,577, dated October 9, 1866.

*To all whom it may concern:*

Be it known that we, ORIN L. BASSETT, THOMAS R. BEARSE, and WILLIAM B. WILBER, of Taunton, in the county of Bristol and State of Massachusetts, have invented new and useful Improvements in Tack-Machines; and we do hereby declare that the following is a full, clear, and exact description thereof, which will enable others skilled in the art to make and use the same, reference being had to the accompanying drawings, forming part of this specification, in which—

Figure 1, Plate 1, is a plan or top view of the machine; Fig. 2, Plate 1, a longitudinal vertical section taken in the plane of the line $z\ z$, Fig. 1; Fig. 3, Plate 2, another section, taken in a longitudinal direction and vertical plane, and on the line $x\ x$, Fig. 1, Plate 1; Fig. 4, Plate 2, a transverse vertical section taken in the plane of the line $y\ y$, Fig. 1, Plate 1.

Similar letters of reference indicate like parts.

By the present mode of cutting and making tacks in the "Blanchard" or "double-upper-cutter" machines (so called) it is almost impossible to produce a small head and a fine or good point, for the reason that the tack, after being cut by the cutters, is carried to the die for producing the head upon it by that cutter of the two cutters which cuts the portion of the tack from which the head is produced, so that in case the head is small much difficulty is experienced in the operation, the tack-blank being carried to the die between such upper cutter and a carrier or bearer extending out from the right-hand side of the machine.

In the present improvements the blank is carried by that cutter of the two upper cutters which cuts the body portion of the blank, in conjunction with a bearer or carrier suitably arranged and operated therefor, to the die in which it is to be headed, the said cutter and carrier being so arranged and operating together as to firmly gripe the tack-blank between the two as it is carried by them to the die, when, the jaws of the die having closed about the blank, the carrier is caused to be withdrawn from it, and, passing upward, as well as the cutter, come again into proper position with regard to the cutters for seizing the next tack-blank and carrying it to the die, and so on, as long as the machine is run.

By thus seizing and carrying the tack-blank to the die by its body portion, or that nearest to its point, in lieu of by that portion of which its head is formed, as heretofore, no difficulty is experienced in the forming of the head, even if small—an advantage of the utmost importance, and one which, with the machines now in use, it has been impossible to obtain.

Having thus described in general terms the principal features of the present invention, we will now proceed to explain the same in detail, reference being had to the accompanying plates of drawings, hereinbefore referred to, in which similar letters represent like parts.

A A in the drawings represent the framework of the machine, consisting of a bed-frame, B, having parallel uprights C C, in the upper ends of which turns, extending across from one to the other, a horizontal shaft, D, to which the power used for driving the machine is to be connected in any proper manner; E $E^2$, two horizontal parallel rock-shafts extending transversely across the frame-work, and turning at each end in suitable bearings of the same, to each of which rock-shafts are respectively secured bent or curved arms F $F^2$, which pass upward toward the front end, G, of the machine, and under the driving-shaft D, against the respective eccentric portions H $H^2$ of which they bear by their upper or curved ends I $I^2$, that are held firmly against the same by means of the bow or bent springs J, in contact at one end with the under side of the arms, and at their other secured to the bed-frame of the machine.

In the respective head-pieces K $K^2$ of the rock-shaft arms F $F^2$ cutters L $L^2$ are secured by set-screws $a$, or in any other proper manner, so that they can be readily removed for being sharpened, with their cutting-edges $b$ down and in the same line with each other, forming a continuous cutting-edge. N, the block or rest for the metal strip or blank from which the tack-blanks are to be cut, by the edge or end O of which rest the cutters pass, the metal strip being fed along upon this rest to its end O by any suitable arrangement of feeding devices, or by the hands alone, a guard, P, being fixed to one of the cutter-heads, so as to be in line, or nearly so, with the top of the rest, which guard acts as a stop, and limits and regulates the distance to which the metal strip can be moved forward and projected over the edge or end O of the rest or block N.

Below the cutting-edge of the cutter L, and in line with the division-line between the two cutters, is a hook, $P^2$, which operates as a carrier or bearer to the tack-blank, as will be hereinafter described. This hook is at the outer end of a long spring-arm, Q, secured at its other end to and in the lower and short arm R of the bent lever S, hung upon a fulcrum, T, of the rock-shaft arm F, and extending by its long arm up and toward the front or cutter head of the said arm F, against which lever the cam-wheel U of the driving or main shaft D acts, depressing its end V, and thus swinging it upon its fulcrum, and consequently moving the spring-hook arm Q in a direction away from the block or rest N, a bent spring, W, bearing against the under side of the lever S, throwing it back to its original position and against the stop X of the rock-shaft arm F when the cam-wheel U ceases to act upon it.

Upon the side of the rock-shaft arm F is hung a forked lever, Y, with its two prongs, Z $Z^2$, extending toward the front or cutter head of the arm, one, Z, upward under the cam-wheel U of the main shaft D, and the other downward and over the hook spring-arm Q, near its hook end, the operation of which forked lever upon the hook-arm Q as its prong Z is acted upon by the cam U will be presently explained. $A^2$, a bent spring, arranged upon the rocker-shaft arm E in proper position to act upon the forked lever Y and throw or move it up when the cam has ceased to operate upon it; $B^2$, a block hung by its two arms, $C^2$, to the bed-frame B, and in and between the two uprights B B; $D^2$, an upright arm secured to one side or edge of the block $B^2$, which arm $D^2$, by its upper curved end $E^3$, bears against the eccentric portion $F^3$ of the main shaft D, a bent spring, $G^2$, being hung at one end to said arm, and at its other secured to the bed-frame to hold the said arm firmly against the eccentric $F^3$. In the front edge, $H^3$, of this block $B^2$ one jaw, $I^3$, of the die is secured, directly opposite to which in the rest or block O the other jaw, $J^3$, is fixed, the two jaws being made of suitable form upon their ends facing each other to grasp the tack-blank when inserted in and between the two, and when they are brought together by the action of the eccentric $F^3$ of the shaft D upon the arm $D^2$ of the block $B^2$, holding one jaw of the die.

To one end of the main shaft D, and eccentric therewith, is hung a pitman or connecting-rod, $K^3$, the other end of which is hung to the outer end of the bent or curved portion $L^3$ of the arm or bar $M^2$, secured to the horizontal shaft $N^2$, turning or rocking in suitable bearings of the bed-frame and extending in the direction of its length.

In the end $O^2$ of the bar or arm $M^2$ a hammer, $P^3$, is secured, which hammer projects toward the jaws of the die, and is brought to bear against the projecting end of the metal held therein at the proper times to upset and thus head the same by the swinging or rocking of the arm $M^2$, caused by the turning of the shaft D through the connecting or pitman rod $K^3$, hereinbefore referred to.

The operation of the machine is as follows: The metal strip from which the tacks are to be made is placed upon the block or rest N, with one end toward its end O and against the guard or stop P, when, turning the driving-shaft D in the proper direction, the two cutters L $L^2$ are then brought down and upon the said metal strip or plate through the action of the eccentrics H $H^2$, upon the rock-arms in which they are secured, cutting off the projecting end of such strip beyond the edge D of the rest N, when, the cutter $L^2$ remaining stationary, the other cutter, L, or that which cuts the portion of the tack constituting its body and point, continues its downward movement by the peculiar form of the eccentric H operating the same, firmly and tightly nips it in the hook $P^2$ of the spring-arm Q, and, depressing such arm, carries the blank down with and in it into and between the two open jaws $I^3$ and $J^3$ of the die, that, then closing upon the same, by the forward movement of the movable one $I^3$ of the two, firmly clasp and hold it between them, when, the hammer $P^3$ being brought to bear upon the projecting end of such tack-blank, a head is produced upon it, the hook while such heading is taking place being depressed by the prong $Z^2$ of the forked lever Y, so as to clear the tack-blank, leaving it in the die, when, the arm being drawn back by the action of the lever S, to which it is hung, it then moves upward, resuming its original position under the cutter L and in place for the next tack-blank cut from the metal strip by the cutters, that, during the above-described action of the hook or carrier $P^2$ and the hammer, have been raised and brought by means of the springs J to their original position for again descending upon the metal strip or bar from which the tacks are cut by continuing the rotation of the driving-shaft D, after which the die-jaws open from each other, releasing the tack between them, that falls out of the machine.

From the above description of our improved machine for making tacks it is plain to be seen that the cutter which, in connection with the carrier $P^3$, conveys the tack-blank to the die is the one by which the body and point portion of the tack is cut, whereby tacks with small heads can be made, which, with the manner of conveying the tack-blank to the die heretofore employed, by the action of such one of the cutters as cuts the head portion of the blank, it was impossible to do, as is well known to all conversant with the use of such machines—very important disadvantages and inconveniences, from the fact that the greater proportion of tacks used are those having small heads.

We claim as new and desire to secure by Letters Patent—

1. The combination of a carrier or bearer for the tack-blank with any one of the cutters, be they more or less in number, used for cutting the tack-blanks, when arranged, and so as to operate together, substantially in the manner and for the purpose specified.

2. The carrier or bearer for conveying the tack-blanks to the die to be headed, attached to either one or the other of the arms to which the cutters are attached, in combination with a forked or other suitable lever arranged with regard to the said carrier, and so as to operate upon it in conjunction with the said cutter-arm, substantially as and for the purpose described.

ORIN L. BASSETT.
    THOMAS R. BEARSE.
    WILLIAM B. WILBER.

Witnesses:
 GEO. W. WHITE,
 L. F. DUDLEY.